United States Patent Office 3,051,576
Patented Aug. 28, 1962

3,051,576
NUTRITIONAL COMPOSITION AND METHOD
OF MAKING THE SAME
Andreas Lendvai, Spring Valley, N.Y.
(202 Van Ripper Ave., North Tarrytown, N.Y.)
No Drawing. Filed Dec. 24, 1959, Ser. No. 861,752
20 Claims. (Cl. 99—97)

The present invention relates to a nutritional composition and to a method of making the same.

More particularly, the present invention relates to an autolyzed yeast product of improved palatability.

It is well known, that yeast protein autolyzates are valuable nutritional products or adjuncts to nutritional products. Autolyzed yeast may contain a mixture of partially and completely autolyzed protein, possibly also including non-autolyzed portions, whereby the degree of autolyzation can be controlled so as to obtain the desired end product. In addition to containing valuable amino acids and intermediate autolyzed yeast compounds, such products are also rich in important vitamins, particularly of the vitamin B group and in ergosterin.

However, the palatability of protein autolyzates and particularly of protein autolyzates made of yeast, has been greatly impaired by the distinct and rather strong cheese-like odor and taste of the product. This characteristic cheese-like odor and taste of yeast autolyzate is caused by various amino acids and other volatile acids which form part of the end product of the enzymatic decomposition or autolyzation of the yeast. This characteristic more or less cheese-like odor and taste of yeast autolyzation products reduces the palatability of the same, and considerably limits the usefulness of this otherwise most valuable nutritional product. Frequently, the consumer who should include in his diet such yeast autolyzation products either as a general nutritional component or as a source of vitamin B, will object to the characteristic odor and flavor of the product and become either unwilling or physically incapable of ingesting the same.

It has been attempted to improve the odor and taste of protein autolyzates, particularly yeast autolyzates, by allowing a mixture of yeast and of sugar or polymer compounds which can be split to form sugar, such as starch, inulin, etc. to stand for a prolonged period of time at room temperature. However, this method does not give the desired results, particularly on a large industrial scale, because the yeast autolyzation at room temperature will take up to about 60 days. Obviously, this very long extension of the process would make it very difficult to schedule production in accordance with demand and would inherently cause additional economic and technical disadvantages. Furthermore, it is extremely difficult to control the autolyzation of the yeast of such a yeast-sugar mixture at room temperature in such a manner that the desired composition of the end product will be obtained with reasonable certainty. Thus, it is hardly possible to achieve in this manner a final product of standardized or substantially standardized composition.

To a limited degree, it has been found possible to overcome the above described disadvantages, by carrying out the autolyzation of the yeast in the presence of a suitable carbohydrate, i.e. in the presence of a sugar or of a polymer sugar, at an elevated temperature and for a reduced length of time. Thus, at a temperature of between 40 and 60° C., i.e. at a temperature at which the autolyzing enzymes are most active, the autolyzation will be completed within a period of between about one hour and 2 days. The presence of sugar will to some extent counteract the formation of the cheese-like and undesirable characteristics of the end product. While it was possible in this manner to overcome to a limited degree the consumer objections against the prior autolyzed yeast preparations, the thus obtained product still did not have the desired high degree of palatability. Need was felt for a further improvement in the odor and taste of nutritional preparations which as an essential ingredient contain yeast autolyzate, in order to improve consumer acceptance.

It is therefore an object of the present invention to provide a method of producing a nutritional composition of improved palatability and containing a yeast autolyzate while being free of the characteristic cheese-like odor and taste of autolyzed yeast.

It is another object of the present invention to provide a nutritional composition and a method of making the same, which composition will be highly palatable and will have a pleasing taste and odor and can be produced within a relatively short period of time in a simple and economical manner.

Other objects and advantages of the present invention will become apparent from a further reading of the description and of the appended claims.

With the above and other objects in view, the present invention contemplates a method of producing a nutritional composition comprising the steps of forming a mixture consisting essentially of a major portion of a yeast adapted to be autolyzed at a first elevated temperature and of a minor portion of a carbohydrate adapted to be fermented with the yeast so as to cause the mixture to become liquefied and to ferment, allowing the thus formed mixture to ferment, mixing the fermenting mixture with a carbohydrate selected from the group consisting of sugars and sugar polymers in a quantity sufficient to substantially arrest fermentation of the mixture so as to form a second mixture, heating the second mixture to the first elevated temperature for a period of time sufficient to autolyze the yeast thereof to a desired predetermined degree, and heating the thus treated mixture to a second elevated temperature higher than the first elevated temperature and sufficiently high to prevent further autolyzation of the yeast, whereby a nutritional composition containing autolyzed yeast and substantially free of the characteristic taste and odor of autolyzed yeast is formed.

The second elevated temperature preferably should be within a range sufficiently high to denaturize autolyzing enzymes but, on the other hand, sufficiently low to keep destruction of vitamins as low as possible.

According to a preferred embodiment, the method of the present invention comprises the steps of forming a mixture consisting essentially of between about 80–98% and most preferably between 85–95% of yeast adapted to be autolyzed at a first elevated temperature of between about 40 and 60° C. and of between about 20–2% and most preferably between 15 and 5% of carbohydrates selected from the group consisting of sugars and sugar polymers adapted to be fermented with the yeast, and allowing the thus formed mixture to ferment at a temperature of between about 25 and 30° C. for a period of time sufficient to cause due to the fermentation, an increase in the volume of the mixture equal to between about 20 and 50% of the original volume thereof, mixing the fermenting mixture with a carbohydrate selected from the group consisting of sugars and sugar polymers in a quantity approximately equal to between once and twice the weight of the fermenting mixture so as to form a second mixture and to substantially arrest fermentation, heating the second mixture for a period of between about one hour and 48 hours in a closed vessel at a temperature of about 55° C. so as to autolyze the yeast thereof, heating the thus treated mixture to a second elevated temperature of between about 85 and 95° C. for a period of about two hours so as to prevent further autolyzation of the yeast, and drying the thus further heated mixture under a partial vacuum, whereby a nutritional composition containing autolyzed yeast and substantially free of the characteristic cheese-like taste and odor of autolyzed yeast is formed.

The initial yeast-sugar mixture must contain a proportion of sugar which is to be so choosen that:

(a) The mixture will be liquefied;

(b) The mixture will be capable of fermenting; and (c) Fermentation will be sufficiently strong to cause a substantial increase in the volume of the mixture. Within the percentage range of sugar which will fulfill the above requirements, it is then possible to choose a specific proportion and thereby to control within certain limits the taste and flavor of the final product. The more intensive the fermentation the more esterified compounds will be in the final product.

The present invention also includes as a new composition of matter, the product which is obtained by following the above described method.

Yeast autolyzates which are produced, according to the present invention, possess a pleasantly sweet taste and have been found to be easily palatable in many cases where inclusion of such nutritional composition in the diet is beneficial and where the products of substantially similar composition with respect to the yeast autolyzate but of less desirable odor and taste have been refused.

It is a surprising advantage of the present invention that the nutritional composition will retain its "sweet" taste even after prolonged storage and will not develop the bitter taste experienced after storage in prior art products.

The taste and odor of the nutritional composition produced according to the present invention can be further changed or improved by adding products such as coffee, chocolate or caramel, since the product is free of undesirable taste or odor such as the cheese-like characteristics of known yeast autolyzates, which would interfere with the successful admixture of such flavoring agents.

The nutritional composition produced according to the present invention can be used as is, or as an additive for food products in general, particularly as an additive to sweet goods and pharmaceutical preparations. Due to its generally bland and neutral quality, it is also possible to admix additional vitamin products, trace elements or other nutritional additives to the yeast autolyzate produced according to the present invention.

In order to prevent subsequent enzymatic changes or further decomposition of the finished product, it is desirable to terminate the enzymatic decomposition of the yeast by heating the product which has been autolyzed to the desired degree, for a relatively short period of time to a temperature of between about 70–120° C., preferably between 70–100° C., in order to destroy the autolyzation causing enzymes. It has been found that particularly good results are obtained by heating the product to a temperature of between 85–95° C., since at such relatively low temperatures less destruction of vitamins will occur and still further autolyzation will be prevented. Such heating has to be carried out for a sufficient length of time to assure a reasonable shelf life of the product.

Generally, the product of the present invention is obtained in a mash-like, heavy viscous, slowly flowing state. It might, for instance have the consistency of honey. If it is desired, the product can be transformed into solid state in numerous manners known in the art, such as by evaporating most of the water content of the product. Evaporation is preferably carried out under reduced pressure and may, for instance, be accomplished by spray drying.

Broadly it has been found advantageous, according to the present invention, to admix to the yeast a relatively small quantity, such as between 5 and 15% per weight of sugar or of a fermentable sugar polymer, and allow such mixture to ferment at a temperature which preferably will be maintained between 25–30° C. Fermentation is continued until the volume of the mass has markedly increased, preferably between 20 and about 50%. Thereafter, additional quantities of carbohydrates, i.e. sugars or sugar polymers, are added in such an amount that fermentation will be substantially stopped. For instance, a quantity of sugar equal to the weight or equal to twice the weight of the fermenting mass may be admixed. The thus obtained mixture is then kept in a closed vessel for between about one hour and 48 hours at a temperature of between about 40 and 60° C. It has been found desirable to stir the mixture while keeping the same at such elevated temperature in the closed vessel. As soon as autolyzation has progressed to the desired extent, the mixture is further heated to a temperature of between 70 and 120° C. and thereby stabilized. It is also possible to allow the autolyzed mixture to cool from a temperature of between about 40 and 60° C. to about room temperature or even lower, and to stabilize the mixture at some later time by heating to a temperature of between 70 and 120° C. This is possible because, as stated further above, autolyzation at temperatures considerably below 40° C. takes place at an extremely slow pace.

The reason why, according to the present invention it is preferred to carry out autolyzation of the fermenting yeast in a closed vessel, that is during the heating of the mixture to a temperature of between 40 and 60° C., a certain degree of overpressure will be formed in the closed vessel and such overpressure will, on the one hand, quickly reduce the fermenting activity of the yeast, and, on the other hand, will favor the formation, during autolyzation, of ester compounds which will endow the finished product with a particularly pleasant taste and odor. This ester formation is further enhanced by the invertase present in the mixture, since the monosaccharides which in the presence of invertase are formed from the polymerized carbohydrates of the mixture, will participate in the formation of compounds of pleasing odor and taste. Thus, according to the present invention, the yeast must be actively fermenting and the autolyzation thereof is preferably carried out in a closed vessel so that under the conditions of elevated temperature and pressure prevailing during autolyzation in the closed vessel, the formation of compounds of desirable odor and taste will be enhanced.

By varying temperature, time and pressure within the above described limits, it is possible to control the taste and odor of the final product, or to produce a series of products which are of different taste and odor, all of which, however, will be completely free of the cheese-like and frequently unpleasant characteristics of prior art yeast autolyzates.

The process of the present invention may be conveniently subdivided into a first stage during which yeast and a limited quantity of a fermentable carbohydrate are mixed and subjected to fermentation, a second stage during which an additional quantity of carbohydrates is admixed, fermentation is stopped, the temperature is raised and the mixture subjected to yeast autolyzation, and a third stage (which, however, can be modified or omitted) in which the temperature is raised sufficiently to destroy or denature the enzymes and thus stop further autolyzation of the yeast, and during which the finished product may be dried and/or compounded with flavoring or other additives.

Referring now to the first stage, the yeast which forms part of the fermentable mixture, may be pressed yeast, or bakery yeast, or brewer's yeast which has been suitably treated so as to lose its bitter characteristics. Pressed yeast contains between about 73 and 75% water and between about 25 and 27% dry substance. All of the various types of industrial yeasts may be used according to the method of the present invention, in combination with a suitable carbohydrate, i.e. a carbohydrate which can be fermented by such yeast. Thus, *Saccharomyces cerevisiae*, which is used in alcohol and yeast production for baker's yeast, in the beer industry, etc. may be used, or for instance, *Torula utilis*, which is employed in the manufacture of alcohol from sulfite waste liquors and which is capable of splitting pentoses into ethanol and carbondioxide. Of the sugars and sugar polymers which may be used in the fermenting mixture, the following are named by way of example only:

Hexoses:
    Glucose, fructose, galactose, mannose, allose, altrose, talose, idose, gulose.
Pentoses:
    Xylose, arabinose, ribose, ramnose.
Disaccharides:
    Saccharose, lactose, maltose, iso-maltose, melibiose, trehalose.
Trisaccharides:
    Raffinose, gentianose, melicitose.
Polysaccharides:
    Starch, dextrine, pektine, glykogen, inulin.

Preferably, the fermenting mixture will be formed of between 80% and 98% of yeast and between 20% and 2% of the fermentable sugar or polysaccharide. It has been found that generaly best results are obtained by mixing between 85 and 95% of pressed yeast with between 15 and 5% of the fermentable carbohydrate.

There is no definite lower limit for the carbohydrate percentage in the mixture. Of course, there must be sufficient carbohydrate present to maintain fermentation so that the volume of the fermenting mass will rise preferably to between about 20 and 50%. The degree of rising of the fermenting mixture has been found to be an easily observable indicator or measure of the extent to which fermentation of the mixture has progressed. The maximum quantity of the carbohydrate must be below the percentage thereof which might inhibit fermentation.

It will be noted that upon mixing the dry sugar, such as dextrose or saccharose with the pressed yeast, the mixture will become quickly liquefied.

When carrying out the process of the present invention at a somewhat larger scale, it is advisable at this point, i.e. as soon as the mixture has been formed, to separate a relatively small portion such as 100 cm.³ therefrom and to place this portion into a calibrated cylinder. This separated portion is then maintained at the same temperature at which the main portion of the mixture is maintained during the fermentation thereof.

Thus, the sample in the cylinder will ferment at the same rate as the main portion and the increase in the volume of the sample can be observed in the calibrated cylinder. As soon as the increase in volume has reached the desired percentage such as between 20 and 50%, for instance when the volume in the cylinder has increased from 100 cm.³ to 140 cm.³, fermentation is to be stopped in the main portion of the fermenting mixture.

Fermentation is carried out at optimum fermentation temperatures such as are well known in the art and which are generally between 0° C. and 40° C., preferably between 25° C. and 30° C. By carrying out a slow fermentation at relatively low temperatures such as between 4° C. and 8° C. a particularly desirable flavor or taste is obtained.

With completion of the fermentation, the first stage of the process is terminated and the second stage starts with the admixture to the fermenting mass of the additional and much larger quantity of carbohydrates. Preferably, carbohydrates of the types described below are now added in a quantity which is equal to between once and twice the weight of the fermenting mixture, or the quantity of the carbohydrates which is now added can be so calculated that for each part of yeast, between 1 and 2 parts of carbohydrates will be added.

The carbohydrates which are now admixed and which will be subjected together with the yeast to the optimum autolyzation temperature of the latter may include saccharose, dextrose, starch, or any other edible sugars or sugar polymers.

The thus formed mixture, which will now contain approximately between 33 and 50% yeast, is now subjected to autolyzation at a temperature within the range of between 40 and 70° C., preferably within a range of 40 and 60° C. Excellent results were achieved with the autolyzation temperature of about 55° C.

Autolyzation temperature and the length for which the mixture is kept at such temperature will determine the degree of autolyzation and the characteristics of the final product. Generally, the autolyzation time will be between one hour and 48 hours.

The following examples are given as illustrative only of the present invention without, however, limiting the same to the specific details of the examples.

*Example I*

In a jacketed vessel 1 kg. of pressed yeast having a water content of 25% is intimately mixed with 100 g. of powdered cane sugar so that a pulverulent homogeneous mixture of these two constituents is formed. Preferably, mixing is continued until the entire mixture has been liquefied. At room temperature liquefication takes place within a few minutes, for instance within 5 minutes.

As soon as a homogeneous liquid has been formed, a small portion thereof, for instance 100 cm.³ are placed into a calibrated cylinder. The main portion of the mixture and the small portion in the calibrated cylinder are now allowed to ferment, at a temperature of about 25° C. If room temperature deviates from the desired fermentation temperature, the temperature of the liquefied mixture will be adjusted by indirect heat exchange, with a fluid in the jacket of the vessel.

Fermentation is allowed to proceed until the volume of the mixture in the graduated cylinder will have risen to 135 cm.³. Of course, the mixture in the cylinder must be maintained at the same temperature as the main portion in the jacketed vessel.

Fermentation will have to proceed for between about 15 and 30 minutes until the volume of the mixture has increased by 35%.

As soon as the volume of the liquid in the cylinder has reached 135 cm.³, the contents of the cylinder are poured back into the vessel containing the main portion of the mixture, and 1.5 kg. powdered cane sugar are stirred into the liquid. The temperature of the thus formed homogeneous paste-like or heavy honey-like mixture is now quickly raised to 55° C. and the mixture is allowed to stand under occasional stirring for a period of 16 hours. It is found that after 16 hours autolyzation has progressed to the desired extent and that the product has the desired taste and odor. At this point, the temperaure is quickly raised to 90° C. and the mixture is allowed to stand at about 90° C. for two hours.

The mixture is now ready for packing. Upon cooling, it will form a viscous, brown liquid of pleasing taste and odor which may be consumed as such or included in nutrient compositions containing additional ingredients, for instance honey.

*Example II*

In a jacketed vessel 1 kg. of pressed yeast having a water content of 25% is intimately mixed with 75 g. of powdered dextrose so that a pulverulent homogeneous mixture of these two constituents is formed. Preferably, mixing is continued until the entire mixture has been liquefied. At room temperature liquification takes place within a few minutes, for instance within 5 minutes.

A small portion of the mixture is separated and used for measuring volume increase during fermentation, as more fully described in Example I. The main portion of the mixture and the small portion in the calibrated cylinder are now allowed to ferment, at a temperature of about 18° C. If room temperature deviates from the desired fermentation temperature, the temperature of the liquefied mixture will be adjusted by indirect heat exchange, with a fluid in the jacket of the vessel.

Fermentation is allowed to proceed until the volume of the mixture in the graduated cylinder will have risen to 120 cm.$^3$. Of course, the mixture in the cylinder must be maintained at the same temperature as the main portion in the jacketed vessel.

The desired increase in volume is found to have been reached after 30 minutes of fermentation.

As soon as the volume of the liquid in the cylinder has reached 120 cm.$^3$, the contents of the cylinder are poured back into the vessel containing the main portion of the mixture and a mixture consisting of 1.70 kg. powdered cane sugar and 200 g. potato starch are stirred into the liquid and the vessel containing the mixture is now hermetically closed. The temperature of the thus formed homogenous paste-like or heavy honey-like mixture is now quickly raised to 60° C. and the mixture is allowed to stand under continuous stirring for a period of 10 hours. It is found that after 10 hours autolyzation has progressed to the desired extent and that the product has the desired taste and odor. At this point, the temperature is quickly raised to 90° C. and the mixture is allowed to stand at about 90° C. for two hours.

The mixture is now ready for packing. Upon cooling it will form a viscous, brown liquid of pleasing taste and odor which may be consumed as such or included in nutrient compositions containing additional ingredients, for instance honey.

Many variations of ingredients and treating conditions are within the scope of the present invention. As shown above, autolyzation may be carried out in an open or in a hermetically closed vessel, although a hermetically closed vessel is preferred.

Autolyzation of 1 kg. of fermenting yeast (as described in Examples I and II) may be carried out after admixing the following ingredients which are given by way of example only:

*Example III*

| | Kg. |
|---|---|
| Powdered cane sugar | 1.50 |
| Potato starch | 0.20 |
| Dried skimmed milk | 0.20 |

*Example IV*

| | |
|---|---|
| Powdered cane sugar | 1.40 |
| Potato starch | 0.20 |
| Dried skimmed milk | 0.20 |
| Cocoa powder | 0.10 |

*Example V*

| | |
|---|---|
| Powdered cane sugar | 1.35 |
| Potato starch | 0.20 |
| Dried skimmed milk | 0.20 |
| Cocoa powder | 0.10 |
| Agar-agar powder | 0.05 |

*Example VI*

| | |
|---|---|
| Powdered cane sugar | 1.35 |
| Potato starch | 0.20 |
| Dried skimmed milk | 0.20 |
| Cocoa powder | 0.10 |
| Gelatine powder | 0.05 |

*Example VII*

| | |
|---|---|
| Powdered cane sugar | 1.35 |
| Potato starch | 0.20 |
| Dried skimmed milk | 0.20 |
| Cocoa powder | 0.10 |
| Pectin powder | 0.05 |

*Example VIII*

| | |
|---|---|
| Powdered cane sugar | 1.40 |
| Potato starch | 0.20 |
| Dried skimmed milk | 0.20 |
| Instant coffee powder | 0.10 |

*Example IX*

| | |
|---|---|
| Powdered cane sugar | 1.00 |
| Potato starch | 0.20 |
| Dried skimmed milk | 0.10 |
| Pectin containing fruit preparations | 0.60 |

The mixtures given in Examples III–IX are boiled with the required amount of water so as to form a homogenous lump-free mixture. This is preferably done in the manner employed for instance in the candy industry for producing jelly candies or the like.

The finished product which is produced in accordance with any of the preceding examples, can be mixed with various nutrients so as to produce a balanced nutritive composition.

For instance, the finished autolysed mixture which has been heated to a temperature of between 70 and 120° C. so as to inhibit further autolyzation, may be cooled to somewhat below 50 C. and at such temperature, for instance, at a temperature of 45° C., 10% of honey may be admixed, or water soluble vitamins such as vitamin C, for instance in a quantity of 15 g. per 3 kg. of the autolyzed mixture, or fat soluble vitamins, such as 10 g. of beta-carotene per 3 kg. of the autolyzed mass. It is, of course, also possible to admix trace elements and other nutritive supplements or pharmaceutic preparations.

Flavoring ingredients, such as vanilla, lemon oil, orange oil, peppermint, fruit essences and the like may be added to arrive at the desired taste combination.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a nutritional composition, comprising the steps of forming a mixture consisting essentially of a major portion of an autolyzable yeast adapted to be autolyzed at an elevated autolyzation temperature and of a minor portion of a carbohydrate adapted to be fermented with said yeast; allowing the thus formed mixture to ferment; mixing said fermenting mixture with a carbohydrate selected from the group consisting of sugars and sugar polymers in a quantity sufficient to substantially arrest fermentation of said mixture so as to form a second mixture; heating said second mixture to said autolyzation temperature for a period of time sufficient to autolyze the yeast thereof to a desired predetermined degree; and heating the thus treated mixture to a temperature higher than said autolyzation temperature and sufficiently high to prevent further autolyzation of said yeast, whereby a nutritional composition containing autolyzed yeast and substantially free of the characteristic taste and odor of autolyzed yeast is formed.

2. A method of producing a nutritional composition, comprising the steps of forming a mixture consisting essentially of a major portion of an autolyzable yeast adapted to be autolyzed at an elevated autolyzation temperature and of a minor portion of a finely subdivided solid carbohydrate adapted to be fermented with said yeast; subjecting the thus formed mixture at ambient temperature to fermentation; mixing said fermenting mixture with a carbohydrate selected from the group consisting of sugars and sugar polymers in a quantity sufficient to substantially arrest fermentation of said mixture so as to form a second mixture; heating said second mixture to said autolyzation temperature for a period of time sufficient to autolyze the yeast thereof to a desired predetermined degree; and heating the thus treated mixture to a temperature higher than said autolyzation temperature and sufficiently high to prevent further autolyzation of said yeast, whereby a nutritional composition containing autolyzed yeast and substantially free of the characteristic taste and odor of autolyzed yeast is formed.

3. A method of producing a nutritional composition, comprising the steps of forming a mixture consisting essentially of a major portion of an autolyzable yeast adapted to be autolyzed at an elevated autolyzation temperature and of a minor portion of a carbohydrate adapted to be fermented with said yeast; subjecting the thus formed mixture at a temperature of up to about 40° C. to fermentation for a period of time sufficient to cause, due to said fermentation, an increase of between about 20 and 50% in the volume of said mixture; mixing said fermenting mixture with a carbohydrate selected from the group consisting of sugars and sugar polymers in a quantity sufficient to substantially arrest fermentation of said mixture so as to form a second mixture; heating said second mixture to said autolyzation temperature for a period of time sufficient to autolyze the yeast thereof to a desired predetermined degree; and heating the thus treated mixture to a temperature higher than said autolyzation temperature and sufficiently high to prevent further autolyzation of said yeast; whereby a nutritional composition containing autolyzed yeast and substantially free of the characteristic taste and odor of autolyzed yeast is formed.

4. A method of producing a nutritional composition, comprising the steps of forming a mixture consisting essentially of a major portion of yeast adapted to be autolyzed at a first elevated temperature of between about 40 and 60° C. and of a minor portion of a carbohydrate adapted to be fermented with said yeast; subjecting the thus formed mixture at a temperature of between about 25° and 30° C. to fermentation; mixing said fermenting mixture with a carbohydrate selected from the group consisting of sugars and sugar polymers in a quantity sufficient to substantially arrest further fermentation of said mixture so as to form a second mixture; heating said second mixture to said first elevated temperature for a period of time sufficient to autolyze the yeast thereof to a desired predetermined degree; and heating the thus treated mixture to a second elevated temperature of between about 70° and 120° C. and being sufficiently high to prevent further autolyzation of said yeast, whereby a nutritional composition containing autolyzed yeast and substantially free of the characteristic taste and odor to autolyzed yeast is formed.

5. A method of producing a nutritional composition, comprising the steps of forming a mixture consisting essentially of between 80% and 98% of yeast adapted to be autolyzed at a first elevated temperature of between about 40 and 60° C. and of between 2% and 20% of at least one carbohydrate selected from the group consisting of sugars and sugar polymers adapted to be fermented with said yeast; allowing the thus formed mixture to ferment at a temperature and for a period of time sufficient to cause, due to said fermentation, an increase in the volume of said mixture equal to between about 20% and 50% of the original volume thereof; mixing said fermenting mixture with a carbohydrate selected from the group consisting of sugars and sugar polymers in a quantity approximately equal to twice the weight of said fermenting mixture so as to form a second mixture and substantially arrest fermentation; heating said second mixture for a period of at least about one hour at a temperature of between about 40 and 60° C. so as to autolyze the yeast thereof; and heating the thus treated mixture to a second elevated temperature of between about 70 and 120° C. so as to prevent further autolyzation of said yeast, whereby a nutritional composition containing autolyzed yeast and substantially free of the characteristic taste and odor of autolyzed yeast is formed.

6. A method of producing a nutritional composition, comprising the steps of forming a mixture consisting essentially of between 18 and 19 parts of yeast adapted to be autolyzed at a first elevated temperature of between about 40 and 60° C. and of between 2 and 1 part of carbohydrate selected from the group consisting of sugars and sugar polymers to be fermented with said yeast; allowing the thus formed mixture to ferment at a temperature of between about 25 and 40° C. for a period of time sufficient to cause, due to said fermentation, an increase in the volume of said mixture equal to about 50% of the original volume thereof; mixing said fermenting mixture with a carbohydrate selected from the group consisting of sugars and sugar polymers in a quantity approximately equal to twice the weight of said fermenting mixture so as to form a second mixture and substantially arrest fermentation; heating said second mixture for a period of at least about one hour in a closed vessel at a temperature of between about 40 and 60° C. so as to autolyze the yeast thereof; and heating the thus treated mixture to a second elevated temperature of between about 70 and 100° C. so as to prevent further autolyzation of said yeast, whereby a nutritional composition containing autolyzed yeast and substantially free of the characteristic taste and odor of autolyzed yeast is formed.

7. A method for producing a nutritional composition, comprising the steps of forming a mixture consisting essentially of a major portion of an autolyzable yeast adapted to be autolyzed at an elevated autolyzation temperature and of a minor portion of a carbohydrate adapted to be fermented with said yeast; allowing the thus formed mixture to ferment; mixing said fermenting mixture with a carbohydrate selected from the group consisting of sugars and sugar polymers in a quantity sufficient to substantially arrest fermentation of said mixture so as to form a second mixture; heating said second mixture in a closed vessel to said autolyzation temperature for a period of time sufficient to autolyze the yeast thereof to a desired predetermined degree; and heating the thus treated mixture to a temperature higher than said autolyzation temperature and sufficiently high to prevent further autolyzation of said yeast, whereby a nutritional composition containing autolyzed yeast and substantially free of the characteristic taste and odor of autolyzed yeast is formed.

8. A method of producing a nutritional composition, comprising the steps of forming a mixture consisting essentially of a major portion of an autolyzable yeast adapted to be autolyzed at an elevated autolyzation temperature and of a minor portion of a carbohydrate adapted to be fermented with said yeast; allowing the thus formed mixture to ferment; mixing said fermenting mixture with a carbohydrate selected from the group consisting of sugars and sugar polymers in a quantity sufficient to substantially arrest fermentation of said mixture so as to form a second mixture; heating said second mixture in a closed vessel to said autolyzation temperature for a period of time sufficient to autolyze the yeast thereof to a desired predetermined degree; further heating the thus treated mixture to a temperature higher than said autolyzation temperature and sufficiently high to prevent further autolyzation of said yeast, and drying the thus further heated mixture, whereby a nutritional composition containing autolyzed yeast and substantially free of the characteristic taste and odor of autolyzed yeast is formed.

9. A method of producing a nutritional composition, comprising the steps of forming a mixture consisting essentially of between 80% and 98% of yeast adapted to be autolyzed at a first elevated temperature between about 40 and 60° C. and of between 2% and 20% of a carbohydrate selected from the group consisting of sugars and sugar polymers adapted to be fermented with said yeast; allowing the thus formed mixture to ferment for a period of time sufficient to cause, due to said fermentation, an increase in the volume of said mixture equal to between about 20% and 50% of the original volume thereof; mixing said fermenting mixture with a carbohydrate selected from the group consisting of sugars and sugar polymers in a quantity approximately equal to twice the weight of said fermenting mixture so as to form a second mixture and substantially arrest fermentation; heating said second mixture for a period of at least about one hour at a temperature of about 55° C. so as to autolyze the yeast thereof; and heating the thus treated mixture to a second elevated temperature of between about 70 and 120° C. so as to prevent further autolyzation of said yeast, whereby a nutritional composition containing autolyzed yeast and substantially free of the characteristic taste and odor of autolyzed yeast is formed.

10. A method of producing a nutritional composition, comprising the steps of forming a mixture consisting essentially of between 80% and 98% of yeast adapted to be autolyzed at a first elevated temperature of between about 40 and 60° C. and of between 2% and 20% of a carbohydrate selected from the group consisting of sugars and sugar polymers adapted to be fermented with said yeast; allowing the thus formed mixture to ferment at a temperature of between about 25 and 30° C. for a period of time sufficient to cause, due to said fermentation, an increase in the volume of said mixture equal to about 20–50% of the original volume thereof; mixing said fermenting mixture with a carbohydrate selected from the group consisting of sugars and sugar polymers in a quantity sufficient to form a second mixture consisting essentially of one part yeast and between one and two parts carbohydrate and sufficient to substantially arrest fermentation; heating said second mixture for a period of between 1 hour and 48 hours at a temperature of between about 40 and 60° C. so as to autolyze the yeast thereof; and heating the thus treated mixture to a second elevated temperature of between about 70 and 120° C. so as to prevent further autolyzation of said yeast, whereby a nutritional composition containing autolyzed yeast and substantially free of the characteristic taste and odor of autolyzed yeast is formed.

11. A method of producing a nutritional composition, comprising the steps of forming a mixture consisting essentially of between 80% and 98% of yeast adapted to be autolyzed at a first elevated temperature of between about 40 and 60° C. and of between 2% and 20% of a carbohydratae selected from the group consisting of sugars and sugar polymers adapted to be fermented with said yeast; allowing the thus formed mixture to ferment at a temperature of between about 25 and 30° C. for a period of time sufficient to cause, due to said fermentation, an increase in the volume of said mixture equal to about 50% of the original volume thereof; mixing said fermenting mixture with a carbohydrate selected from the group consisting of sugars and sugar polymers in a quantity approximately equal to twice the weight of said fermenting mixture so as to form a second mixture and substantially arrest fermentation; heating said second mixture for a period of at least about one hour at a temperature of between about 40 and 60° C. so as to autolyze the yeast thereof; and heating the thus treated mixture to a second elevated temperature of between about 85 and 95° C. for a period of about two hours so as to prevent further autolyzation of said yeast, whereby a nutritional composition containing autolyzed yeast and substantially free of the characteristic taste and odor of autolyzed yeast is formed.

12. A method of producing a nutritional composition, comprising the steps of forming a mixture consisting essentially of between 80% and 98% of yeast adapted to be autolyzed at a first elevated temperature of between about 40 and 60° C. and of between 2% and 20% of carbohydrate selected from the group consisting of sugars and sugar polymers adapted to be fermented with said yeast; allowing the thus formed mixture to ferment for a period of time sufficient to cause, due to said fermentation, an increase in the volume of said mixture of the magnitude of about 50% of the original volume thereof; mixing said fermenting mixture with a carbohydrate selected from the group consisting of sugars and sugar polymers in a quantity approximately equal to between once and twice the weight of said fermenting mixture so as to form a second mixture and to substantially arrest fermentation; heating said second mixture for a period of at least between about 1 hour and 48 hours in a closed vessel at a temperature of about 55° C. so as to autolyze the yeast thereof; and heating the thus treated mixture to a second elevated temperature of between about 85 and 95° C. for a period of about two hours so as to prevent further autolyzation of said yeast, whereby a nutritional composition containing autolyzed yeast and substantially free of the characteristic taste and odor of autolyzed yeast is formed.

13. A method of producing a nutritional composition, comprising the steps of forming a mixture consisting essentially of a major portion of an autolyzable yeast adapted to be autolyzed at an elevated autolyzation temperature and of a minor portion of a carbohydrate adapted to be fermented with said yeast; allowing the thus formed mixture to ferment; mixing said fermenting mixture with a carbohydrate selected from the group consisting of sugars and sugar polymers in a quantity sufficient to substantially arrest fermentation of said mixture so as to form a second mixture; heating said second mixture in a closed vessel to said autolyzation temperature for a period of time sufficient to autolyze the yeast thereof to a desired predetermined degree; further heating the thus treated mixture to a temperature higher than said autolyzation temperature and sufficiently high to prevent further autolyzation of said yeast; and drying the thus further heated mixture, whereby a nutritional composition containing autolyzed yeast and substantially free of the characteristic taste and odor of autolyzed yeast is formed.

14. A method of producing a nutritional composition, comprising the steps of forming a mixture consisting essentially of a major portion of an autolyzable yeast adapted to be autolyzed at a first elevated temperature and of a minor portion of a carbohydrate adapted to be fermented with said yeast; allowing the thus formed mixture to ferment; mixing said fermenting mixture with a carbohydrate selected from the group consisting of sugars and sugar polymers in a quantity sufficient to substantially arrest fermentation of said mixture so as to form a second mixture; heating said second mixture in a closed vessel to said autolyzation temperature for a period of time sufficient to autolyze the yeast thereof to a desired predetermined degree; further heating the thus treated mixture to a temperature higher than said autolyzation temperature and sufficiently high to prevent further autolyzation of said yeast; and spray drying the thus further heated mixture, whereby a nutritional composition containing autolyzed yeast and substantially free of the characteristic taste and odor of autolyzed yeast is formed.

15. A method of producing a nutritional composition, comprising the steps of forming a mixture consisting essentially of between 80% and 98% of yeast adapted to be autolyzed at a first elevated temperature of between about 40 and 60° C. and of between 2% and 20% of carbohydrate selected from the group consisting of sugars and sugar polymers adapted to be fermented with said yeast; allowing the thus formed mixture to ferment at a temperature of between about 25 and 30° C. for a period of time sufficient to cause, due to said fermentation, an increase in the volume of said mixture equal to between about 20 and 50% of the original volume thereof; mixing said fermenting mixture with a carbohydrate selected from the group consisting of sugars and sugar polymers in a quantity approximately equal to between once and twice the weight of said fermenting mixture so as to form a second mixture and substantially arrest fermentation; heating said second mixture for a period of at least between 1 hour and 48 hours in a closed vessel at a temperature of about 55% so as to autolyze the yeast thereof; heating the thus treated mixture to a second elevated temperature of between about 85 and 95° C. for a period of about two hours so as to prevent further autolyzation of said yeast; and drying the thus further heated mixture under a partial vacuum, whereby a nutritional composition containing autolyzed yeast and substantially free of the characteristic cheeselike taste and odor of autolyzed yeast is formed.

16. As a nutritional composition, a yeast preparation which consists of a fermenting mixture of yeast and a carbohydrate adapted to ferment with said yeast; intimately mixed with a carbohydrate in a proportion which produces liquefication but suppresses further fermentation of said fermenting mixture.

17. As an article of manufacture, an intimate mixture of a fermented mixture of yeast and of a fermentable carbohydrate; and a quantity of carbohydrate sufficient to cause autolyzation of said yeast and to prevent further fermentation.

18. As an article of manufacture, an intimate mixture of a fermented mixture of yeast and of a fermentable carbohydrate in a quantity by weight equal to between about 5% and 15% of said yeast; and a quantity of carbohydrate at least about equal to the weight of said fermented mixture and sufficient to cause autolyzation of said yeast and to prevent further fermentation.

19. A method of producing a nutritional composition, comprising the steps of forming a mixture consisting essentially of a major portion of an autolyzable yeast adapted to be autolyzed at an elevated autolyzation temperature and of a minor portion of a carbohydrate adapted to be fermented with said yeast; allowing the thus formed mixture to ferment; mixing said fermenting mixture with a flavoring agent and with a carbohydrate selected from the group consisting of sugars and sugar polymers in a quantity sufficient to substantially arrest fermentation of said mixture so as to form a second mixture; heating said second mixture to said autolyzation temperature for a period of time sufficient to autolyze the yeast thereof to a desired predetermined degree; and heating the thus treated mixture to a temperature higher than said autolyzation temperature and sufficiently high to prevent further autolyzation of said yeast, whereby a nutritional composition containing autolyzed yeast and substantially free of the characteristic taste and odor of autolyzed yeast is formed.

20. A method of producing a nutritional composition, comprising the steps of forming a mixture consisting essentially of between 80% and 98% of yeast adapted to be autolyzed at a first elevated temperature of between about 40 and 60° C. and of between 2% and 20% of carbohydrate selected from the group consisting of sugars and sugar polymers adapted to be fermented with said yeast; allowing the thus formed mixture to ferment for a period of time sufficient to cause, due to said fermentation, an increase in the volume of said mixture of the magnitude of about 50% of the original volume thereof; mixing said fermenting mixture with a flavoring agent selected from the group consisting of cocoa, coffee and fruit preparations, and with a carbohydrate selected from the group consisting of sugars and sugar polymers in a quantity approximately equal to between once and twice the weight of said fermenting mixture so as to form a second mixture and to substantially arrest fermentation; heating said second mixture for a period of at least between about 1 hour and 48 hours in a closed vessel at a temperature of about 55° C. so as to autolyze the yeast thereof; and heating the thus treated mixture to a second elevated temperature of between about 85 and 95° C. for a period of about two hours so as to prevent further autolyzation of said yeast, whereby a nutritional composition containing autolyzed yeast and substantially free of the characteristic taste and odor of autolyzed yeast is formed.

References Cited in the file of this patent

UNITED STATES PATENTS

| | | |
|---|---|---|
| 1,538,366 | Willstatter et al. | May 19, 1925 |
| 1,574,776 | Willstatter et al. | Mar. 2, 1926 |
| 1,701,200 | Willstatter et al. | Feb. 5, 1929 |